United States Patent [19]

Stewart

[11] Patent Number: 4,772,654

[45] Date of Patent: Sep. 20, 1988

[54] FIRE RESISTANT POLYMERS CONTAINING MAGNESIUM OXYCHLORIDE

[75] Inventor: Charles W. Stewart, Newark, Del.

[73] Assignee: E. I. Du Pont de Nemours and Company, Wilmington, Del.

[21] Appl. No.: 75,985

[22] Filed: Jul. 21, 1987

[51] Int. Cl.⁴ .............................................. C08K 3/22
[52] U.S. Cl. .................................................. 524/436
[58] Field of Search .......................................... 524/436

[56] References Cited

U.S. PATENT DOCUMENTS

| | | | |
|---|---|---|---|
| 3,778,304 | 12/1973 | Thompson | 117/138 |
| 3,931,095 | 1/1976 | Kondo et al. | 524/437 |
| 3,951,885 | 4/1976 | Thompson | 260/25 |
| 3,963,849 | 6/1976 | Thompson | 521/906 |
| 3,969,453 | 7/1976 | Thompson | 264/42 |
| 4,059,560 | 11/1977 | Lawson et al. | 260/45.7 |
| 4,159,977 | 7/1979 | Hsieh | 524/437 |
| 4,183,991 | 1/1980 | Smiley | 428/220 |
| 4,238,303 | 12/1980 | Fang | 204/98 |

FOREIGN PATENT DOCUMENTS

| | | |
|---|---|---|
| 77242 | 1/1978 | Japan . |
| 1549699 | 8/1979 | United Kingdom . |

OTHER PUBLICATIONS

"The Effect of Compounding Variable on the Rate of Heat and Smoke Release from Polychloroprene Foam", Rubber Chem. Tech. 48, 132, (1975), C. W. Stewart et al.

*Primary Examiner*—Veronica P. Hoke

[57] ABSTRACT

It has now been discovered that a selected magnesium oxychloride can be mixed with a thermoplastic polymer sensitive to decomposition by water, such as polyamides or polyesters, or with fluoropolymers.

3 Claims, No Drawings

FIRE RESISTANT POLYMERS CONTAINING MAGNESIUM OXYCHLORIDE

BACKGROUND

Hydrated inorganic fillers, such as alumina trihydrate, are effective fire and smoke suppressing agents. However, since they lose their water of hydration at relatively low temperatures, they can only be used in compositions which can be processed at low temperatures, such as rubber latex foam, or polyurethane or polystyrene compositions. They cannot be used in resins, such as polyamides or poly(ethylene terephthalate) (PET) which decompose during processing in the presence of water. In addition, they cannot be used in fluoroplastics, which are typically processed at temperatures up to 400° C., since the release of water at very high processing temperatures causes foaming.

Magnesium oxychloride, as prepared, contains over 50% by weight water of hydration. It has the chemical formula $$(MgO)_x \cdot (MgCl_2)_y \cdot (H_2O)_{n'}$$

where $x = 1$ to 5; $y = 1$ to 3; $n' = 10$ to 13. It releases this water, along with a small quantity of HCl, over a very broad temperature range, starting at about 100° C. It would be advantageous if a form of magnesium oxychloride could be found which retained its water of hydration at the processing temperatures of polyamides, poly(ethylene terephthalate) and fluoropolymers, yet released its water at higher temperatures.

SUMMARY OF THE INVENTION

It has now been found that a particular magnesium oxychloride, when mixed with polyamides, thermoplastic polyesters, or fluoropolymers is an effective fire and smoke retardant for such polymers.

DESCRIPTION OF THE INVENTION

Magnesium oxychloride has the formula $$(MgO)_x \cdot (MgCl_2)_y \cdot (H_2O)_{n'}$$

where x is a cardinal number of 1 to 5, y is a cardinal number of 1 to 3, and n' is a number between 10 and 13. By heating it at 300°–350° C. for 1 to 3 hours, it becomes calcined. The calcined magnesium oxychloride has the formula $$(MgO)_x \cdot (MgCl_2)_y \cdot (H_2O)_n$$

where x and y are defined as above, and n is a number between 4 and 7, preferably between 5 and 6.

The calcined magnesium oxychloride is sufficiently heat stable with respect to loss of water of hydration that it can be processed in water-sensitive resins such as polyamides and thermoplastic polyesters without degradation of these, and in fluoropolymers, which are processed at temperatures of up to 350° or 400° C., without foaming them. Yet, enough water of hydration remains after the calcining treatment to make the compound effective as a flame and smoke retardant.

The amount of calcined magnesium oxychloride present in the resins can range from 20 to 200 parts or more per 100 parts of resin. The calcined compound can be mixed with the polymers by any convenient means.

Representative polymers include poly(ethylene terephthalate), poly(butylene terephthalate), nylon 6, nylon 66, nylon 11, nylon 610, nylon 12, poly(tetrafluoroethylene), tetrafluoroethylene/hexafluoropropylene(TPE/HFP), tetrafluoroethylene/perfluoro(propylvinyl ether) (TFE/PPVE), ethylene/chlorotrifluoroethylene (E/CTFE), poly(ether-sulfone), poly(ether-ketone), polyamidimide, polyetherimide, polyphenylene sulfide, polysulfone and aromatic polyester.

The calcined magnesium oxychloride can be mixed into polymers using any of the standard techniques and equipment for mixing dry powders into polymers, including twin screw extruder, two roll mill, Banbury mixer and Farrel continuous mixer.

Generally, calcined magnesium oxychloride is used in polymers heated to above about 300° C. at some step during processing or with polymers where a small concentration of water causes decomposition during processing.

EXAMPLES

Preparation of Hydrated Magnesium Oxychloride

To 90 g of water was added 202 g $MgCl_2 \cdot 6(H_2O)$. After the magnesium chloride dissolved, 80 g MgO fine powder was added with stirring. The composition was allowed to set for 7 days to allow the reaction to go to completion. During this time, the composition hardened to a dry cement-like mass. The composition was ground to a fine powder of particle size about 5 μm. The powder was dried at 100° C. for 2 days. Chemical analysis of the dried powder showed the composition to be represented by the formula $(MgO)_2 \cdot (MgCl_2) \cdot (H_2O)_{11}$, which is consistent with the known chemical formula for magnesium oxychloride; however, the exact crystal structure of magnesium oxychloride is unknown. Thermogravimetric analysis, using a Du Pont 990 Thermal Analyzer, showed weight loss starting at 100° C. with peaks at 200° and 530° C. Weight loss was 42% at 300° C. and 67% at 700° C. Decomposition products consisted of HCl and water. Residue at 1000° C. was 33%. Differential scanning calorimetry, using the Du Pont TA 990, showed an endotherm of 280 cal/g at 150° C., an endotherm of 35 cal/g at 279° C. and an endotherm of 179 cal/g at 465° C. There was also a small exotherm at 550° C.

The above composition was mixed for 5 min., using a Haake mixer at 350° C., into each of three polymers, a 6,6 nylon, a poly(ethylene terephthalate) and an ethylene/tetrafluoroethylene copolymer at the level of 33 wt. % magnesium oxychloride. During mixing, obvious decomposition of the magnesium oxychloride occurred, causing foaming of the polymer in the mixer. The mixtures were compression molded into 15×15×0.32 cm slabs at a temperature of 350° C. In all three cases, there was additional foaming of the samples, due to the release of water vapor during pressing, and the slabs were highly porous in nature.

Preparation of Calcined Magnesium Oxychloride

Magnesium oxychloride, having the chemical formula $(MgO)_2 \cdot (MgCl_2) \cdot (H_2O)_{11}$ was prepared as described above. The composition was ground to a fine powder of particle size about 5μm and was dried at 100° C. for two days, as before. The powder was then calcined at 350° C. for three hours. The resulting material was found by chemical analysis to be consistent with the formula $(MgO)_2 \cdot (MgCl_2)_{0.96} \cdot (H_2O)_{5.6}$. The exact structure of this material is unknown. Thermogravimetric analysis showed no weight loss up to about 400° C. There was one weight loss peak at 530° C. Residue at 1000° C. was 58%. Differential scanning calorimetry showed one endotherm of 258 cal/g at 388° C. There were no exotherms.

Even though the exact crystal structures of the two materials, with chemical formulas $(MgO)_2.(MgCl_2).(H_2O)_{11}$ and
$(MgO)_2.(MgCl_2)_{0.96}.(H_2O)_{5.6}$ are not known, it is obvious that the differences are much more than simply the degree of hydration. This is seen by the large shift in temperature at which the endotherms occur (465° vs. 388° C.). In addition, $(MgO)_2.(MgCl_2)_{0.96}.(H_2O)_{5.6}$ does not have an exotherm at 550° C.

EXAMPLE 1—COMPOSITIONS CONTAINING $(MgO)_2.(MgCl_2)_{0.96}.(H_2O)_{5.6}$.

Calcined magnesium oxychloride prepared as above was mixed for 5 min., using a Haake mixer at 350° C., into each of three polymers—a 6,6 nylon, poly(ethylene terephthalate) and an ethylene/tetrafluoroethylene copolymer, at concentrations of 33 and 50 weight percent. There were no signs of any decomposition or foaming. The composites were compression molded into 15×15×0.32 cm slabs at 350° C. with no decomposition or foaming. This demonstrates that polymer compositions containing calcined magnesium oxychloride, $(MgO)_2.(MgCl_2)_{0.96}.(H_2O)_{5.6}$, can be processed at high temperatures with no decomposition or foaming.

EXAMPLE 2—FLAMMABILITY TESTS OF POLYMERS CONTAINING CALCINED MAGNESIUM OXYCHLORIDE $(MgO)_2.(MgCl_2)_{0.96}.(H_2O)_{5.6}$.

The slabs prepared in Example 1 above were cut into 1.27 cm wide strips and were tested in the Limiting Oxygen Index Test ASTM D2863-70. This test measures the minimum oxygen concentration required to sustain candle-like vertical burning of a material. Thus, a material with a Limiting Oxygen Index (LOI) of less than 23 would be expected to burn in a candle-like manner in air; whereas, a material with an LOI of greater than 23 would self extinguish in air. The Limiting Oxygen Index Test is considered to be one of the most useful flammability tests, since it allows one to precisely rate materials on a numerical basis and simplifies the selection of plastics in terms of flammability.

Compression molded 15×15×0.32 cm slabs of 6,6 nylon, poly(ethylene terephthalate) and ethylene/tetrafluoroethylene copolymer, with no additives, were also prepared and were cut into 1.27 cm wide strips for testing as controls in the LOI test. The results are shown in Tables 1 to 3, below.

TABLE 1

Limiting Oxygen Index of 6,6 Nylon Containing Calcined Magnesium Oxychloride and Processed at 350° C.

| Sample | Control | A | B |
|---|---|---|---|
| Concentration (wt. %) | 0 | 33 | 50 |
| Limiting Oxygen Index | 28 | 33 | 39 |

TABLE 2

Limiting Oxygen Index of Poly(Ethylene Terephthalate) Containing Calcined Magnesium Oxychloride and Processed at 350° C.

| Sample | Control | A | B |
|---|---|---|---|
| Concentration (wt. %) | 0 | 33 | 50 |
| Limiting Oxygen Index | 24 | 28 | 36 |

TABLE 3

Limiting Oxygen Index Test of Ethylene/Tetrafluoroethylene Copolymer Containing Calcined Magnesium Oxychloride and Processed at 350° C.

| Sample | Control | A | B |
|---|---|---|---|
| Concentration (wt. %) | 0 | .33 | 50 |
| Limiting Oxygen Index | 34 | 53 | 78 |

Thus, the addition of calcined magnesium oxychloride to 6,6 nylon, poly(ethylene terphthalate), or ethylene/tetrafluoroethylene copolymer significantly improves the flame resistance of these plastics, as measured by their limiting oxygen index. These plastics were all processed at 350° C., with no apparent decomposition or blowing. This is greater than the allowable processing temperature of any known hydrated filler.

I claim:

1. A blend of a flame retardant quantity of magnesium oxychloride having the formula $(MgO)_x.(MgCl_2)_y.(H_2O)_n$ wherein x is a cardinal number of 1 to 5, y is a cardinal number of 1 to 3, and n is a number between 4 and 7 in a thermoplastic polymer which decomposes during processing in the presence of water, or in a fluoropolymer.

2. A blend of claim 1 wherein the thermoplastic polymer is selected from polyamides and thermoplastic polyesters.

3. A blend of claim 1 wherein n is a number between 5 and 6.

* * * * *